United States Patent Office 3,574,129
Patented Apr. 6, 1971

---

3,574,129
METHOD FOR PREVENTING HYDROLYSIS OF A RARE EARTH OXIDE HOST PHOSPHOR IN A COATING SLURRY
Michael J. Hammond, Raymond F. Herner, and Felix F. Mikus, Towanda, Pa., assignors to Sylvania Electric Products Inc.
No Drawing. Filed Feb. 28, 1969, Ser. No. 803,430
Int. Cl. C09k 1/10
U.S. Cl. 252—301.3        3 Claims

---

ABSTRACT OF THE DISCLOSURE

Disclosed are methods for preventing the hydrolysis of a rare earth oxide host phosphor contained in a slurry of an organic binder sensitized with a dichromate ion by adjusting the pH of the slurry to between about 8 and 11. Also disclosed is a method for applying a slurry of this material to a substrate.

---

BACKGROUND OF THE INVENTION

This invention relates to luminescent materials having enhanced substrate adherence properties and to methods of providing these results.

The invention has particular application to luminescent materials comprised of a rare earth oxide host and a rare earth activator selected from the lanthanide series of elements. This group of materials, or phosphors, includes gadolinium oxide ($Gd_2O_3$:A), yttrium oxide ($Y_2O_3$:A), and mixtures of the two, together with an activator, designated generally in the formula as A. While not generally so considered, yttrium, for purposes of this disclosure, is to be considered one of the rare earth elements. All of the above named materials have strong emission in the red region of the spectrum combined with a brightness considerably in excess of currently employed phosphors used in, for example, color cathode ray tubes. In spite of these obvious qualifications, there has been a general lack of acceptance of these phosphors by tube manufacturers. There are two major reasons for this lack of acceptance, both stemming from the two currently employed methods of making color tube screens. These methods are generally distinguished as a dry phosphor deposition method and a slurry application method. This invention has general utility with the slurry deposition method.

In the slurry method the phosphor is mixed with an organic binder such, for example, as polyvinyl alcohol (PVA) to form a slurry; for example, as by ball milling, and then a sensitizing agent in the form of a dichromate ion furnishing compound is added. After the completion of the slurry, it is applied to the screen area. Subsequently the phosphor-coated screen area is exposed through a negative to actinic radiation and then developed by steps well understood in the art. The process is repeated for each of the colors needed in the final tube.

In regard, however, to the slurry application it has been found that the adherence properties of the rare earth oxide host phosphors are extremely poor. The adherence capabilities degenerate rapidly in direct proportion to the length of time the phosphor exists in the slurry; that is, the shelf-life of the slurry is extremely short. Prior to applicants' invention, a slurry mix of a rare earth oxide host phosphor was generally limited to a shelf-life of around twelve hours. After this time, it is virtually impossible to secure adherence of the phosphor particles to the screen. Furthermore, the longer the phosphor is in the slurry, the more effect there seems to be upon the emission qualities of the phosphor. Other deleterious effects from long slurry shelf-life are denoted by a change in body color of the phosphor from white to yellow and a gradual poisoning or killing of the phosphor material per se. Thus, a rare earth oxide host phosphor remaining too long in contact with the sensitized organic binder ceases to be a phosphor and becomes an inert material exhibiting no luminescent properties under cathode ray excitation.

Applicants have discovered that the poor adherence qualities and the slow poisoning of the phosphor material per se occur because of a reaction between the rare earth oxide host phosphor and the dichromate ion present in the slurry as a photosensitizing agent. If the phosphor is allowed sufficient time in the slurry and the reaction is allowed to go to completion, the end result is no longer a rare earth oxide but a rare earth chromate or dichromate combination.

While the exact nature of the compounds formed by the reaction are not known with any degree of certainty, it is believed that one or more or perhaps all three of the following compounds are formed in various degrees:
$Gd_2(CrO_4)_3$; $Gd_2O_2(CrO_4)$; and $Gd_2O(CrO_4)_2$. The reaction most probably occurring is:

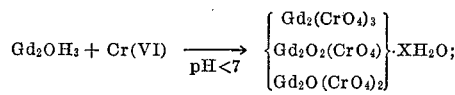

that is, the gadolinium oxide in the presence of Cr(VI) in an acidic carrier will form the various chromate compounds together with some water of hydration.

It has been attempted in the past to enhance the poor adherence qualities of the material and to at least discourage the chromate reaction by applying to the material a particulate coating such, for example, as silica or pyrophosphates; however, without success.

OBJECTS AND SUMMARY OF THE INVENTION

It is, therefore, an object of the invention to enhance the adherence properties of phosphors on a substrate.

It is a further object of the invention to enhance the adherence properties of rare earth oxide host phosphors in color cathode ray tube production.

Still another object of the invention is to provide a slurry having an increased shelf-life.

Yet another object of the invention is the provision of a method of making such slurries.

These objects are accomplished in one aspect of the invention by a method of preventing hydrolysis of a rare earth oxide host phosphor contained in a slurry of an organic binder sensitized with a dichromate ion which comprises insulating the rare earth oxide host phosphor from acid-induced hydrolysis.

In another aspect of the invention there is provided a method of forming a layer of a rare earth oxide host phosphor on a substrate which comprises the steps of forming a slurry of the phosphor and an organic binder. Thereafter, the binder is photosensitized by the addition to the slurry of a dichromate ion furnishing compound. The sensitized slurry thus formed is acidic in nature and thus the pH of the slurry will then be adjusted to about between 8 and 11. After the pH adjustment, the slurry is applied to the substrate.

DESCRIPTION OF THE PREFERRED EMBODIMENTS

For a better understanding of the present invention together with other and further objects, advantages and capabilities thereof, reference is made to the following disclosure and appended claims.

Referring now to the invention with greater particularity, a rare earth oxide host phosphor which is subject to hydrolysis in a slurry of an organic binder such, for example, as PVA sensitized with a dichromate ion, for example, ammonium dichromate, is insulated from the hydrolysis. The insulation may be accomplished by providing the phosphor with a chemically combined outer layer of a material which will not react with the dichromate ion. Such a material, for example, is fluoride, and further details of this method may be found in U.S. patent application S.N. 803,429, assigned to the assignee of the present invention and filed concurrently herewith.

The insulation from the hydrolysis reaction may also be accomplished by adjusting the pH of the slurry from about 8 to 11. Under prior art slurry conditions, the slurry compound was acidic; that is, it had a pH of less than 7. Under these conditions, the hereinbefore described reactions occurred, causing the formation of a rare earth chromate or dichromate compound.

The pH of the slurry may be adjusted by the addition thereto of any suitable caustic agent such, for example, as ammonium hydroxide. The rare earths generally found beneficial with this technique are those selected from the group consisting of yttrium oxide, gadolinium oxide, and yttrium-gadolinium oxide.

By way of example, a slurry having the increased shelf-life and lack of hydrolytic reaction may be formulated as follows:

104 g. of phosphors ($Gd_2O_3$:Eu, $Y_2O_3$:Eu, or a combination of the two) is combined with 140 ml. of 10% PVA solution, 104 ml. $H_2O$, 0.6 ml. Tanol 731, and 0.05 ml. octyl alcohol. The pH is adjusted to between 9–9.5 and this initial slurry is ball milled for about 45 minutes. After the milling 0.3 ml. of a 10% solution of alkanol B and 600 mg. of ammonium dichromate are added. The pH is again adjusted to between 8 and 11, preferably between 9 and 9.5, with an aqueous solution of $NH_4OH$. Thereafter the viscosity is adjusted to between 55 and 60 cp. and the slurry is screened through a 325 mesh. The slurry is now ready for storage or screening.

Referring now to the method of applying a layer of a rare earth oxide host phosphor on a substrate, the substrate is first cleaned thoroughly of possible contaminants by a series of acid washes and water rinses. The substrate may be a glass plate or the interior surface of a cathode ray tube face panel.

The slurry is formed as described above. After thorough cleaning of the substrate, the slurry is applied to the substrate area by known techniques and any excess removed. Thereupon the now coated substrate is exposed and developed by steps well understood in the art to form a screen.

Thus it will be seen that by utilizing this invention the shelf-life of a slurry employing any of the rare earth phosphors noted herein is improved. Further, the adherence capabilities are greatly enhanced and the original brightness of the phosphor preserved through the elimination of the deleterious hydrolytic reaction which formerly destroyed the phosphor.

Thus, while there have been shown and described what are at present considered the preferred embodiments of the invention, it will be obvious to those skilled in the art that various changes and modifications may be made therein without departing from the scope of the invention as defined by the appended claims.

What is claimed is:
1. A method of preventing hydrolysis of a rare earth oxide host phosphor contained in a slurry of an organic binder sensitized with a dichromate ion which comprises insulating the rare earth oxide host phosphor from acid induced hydrolysis by adjusting the pH of said slurry from about 8 to 11 by the addition thereto of ammonium hydroxide.
2. The method of claim 1 wherein said pH is adjusted to be between 9 and 9.5.
3. The method of claim 1 wherein said phosphor host is selected from the group consisting of yttrium oxide, gadolinium oxide, and yttrium-gadolinium oxide.

References Cited
UNITED STATES PATENTS

| | | | |
|---|---|---|---|
| 3,409,558 | 11/1968 | Kachel | 252—301.3 |
| 3,409,559 | 11/1968 | Benson | 252—301.3 |
| 3,461,077 | 8/1969 | Kobayashi et al. | 252—301.3 |

ROBERT D. EDMONDS, Primary Examiner

PO-1050
(5/69)

UNITED STATES PATENT OFFICE
CERTIFICATE OF CORRECTION

Patent No. 3,574,129                Dated 4/6/71

Inventor(s) Michael J. Hammond, Raymond F. Herner and Felix F Mikus

It is certified that error appears in the above-identified patent and that said Letters Patent are hereby corrected as shown below:

Column 2, line 22 of the specification should read - - $Gd_2O_3$ - -

Signed and sealed this 3rd day of August 1971.

(SEAL)
Attest:

EDWARD M. FLETCHER, JR.
Attesting Officer

WILLIAM E. SCHUYLER, JR.
Commissioner of Patents